United States Patent
Nash et al.

(10) Patent No.: US 7,021,146 B2
(45) Date of Patent: Apr. 4, 2006

(54) ATTITUDE SENSOR

(75) Inventors: Philip John Nash, Dorchester (GB); Mark Andrew Tanner, Dorchester (GB)

(73) Assignee: QinetiQ Limited, (GB)

(*) Notice: Subject to any disclaimer, the term of this patent is extended or adjusted under 35 U.S.C. 154(b) by 61 days.

(21) Appl. No.: 10/501,375

(22) PCT Filed: Jan. 8, 2003

(86) PCT No.: PCT/GB03/00035

§ 371 (c)(1),
(2), (4) Date: Jul. 14, 2004

(87) PCT Pub. No.: WO03/062750

PCT Pub. Date: Jul. 31, 2003

(65) Prior Publication Data

US 2005/0120796 A1    Jun. 9, 2005

(30) Foreign Application Priority Data

Jan. 18, 2002 (GB) .................. 0201162

(51) Int. Cl.
*G01H 1/00* (2006.01)
*H04B 11/00* (2006.01)
(52) U.S. Cl. ................... 73/653; 367/134
(58) Field of Classification Search ........ 73/653, 73/514.35, 510, 655, 493, 657; 367/134; 33/366.12, 366.24; 356/387; 250/227, 338, 250/331 R See application file for complete search history.

(56) References Cited

U.S. PATENT DOCUMENTS

| 4,599,697 A | 7/1986 | Chan et al. |
| 4,799,159 A | 1/1989 | Davidson et al. |
| 4,820,016 A * | 4/1989 | Cohen et al. ............... 385/5 |

(Continued)

FOREIGN PATENT DOCUMENTS

DE    3710647    10/1988

(Continued)

*Primary Examiner*—Hezron Williams
*Assistant Examiner*—Jacques M. Saint-Surin
(74) *Attorney, Agent, or Firm*—McDonnell Boehnen Hulbert & Berghoff LLP

(57) ABSTRACT

The present invention provides an attitude sensing device and method for determining an attitude of a reference axis of a package containing a fiber optic sensor sensor. The attitude sensing device comprises an electro-mechanical attitude sensor for generating an electrical signal indicative of the attitude sensor, and converter logic for converting the electrical signal into a stimulus signal. A local power source is preferably provided for the electro-mechanical attitude sensor in the converter logic. The stimulus signal is such that the fiber optical sensor is responsive to the stimulus signal to cause a variation in at least one predetermined property of an optical signal transmitted through the fiber optic sensor, the attitude of the reference axis being determinable from the variation of the predetermined property. By this approach, it is possible to use the existing fiber optic sensor within the package, along with the corresponding existing telemetry and multiplexing system, to recover the information from the electro-mechanical attitude sensor.

23 Claims, 5 Drawing Sheets

U.S. PATENT DOCUMENTS

| | | |
|---|---|---|
| 5,206,499 A | 4/1993 | Jungwirth et al. |
| 5,659,137 A | 8/1997 | Popp |
| 5,736,641 A | 4/1998 | Selby et al. |
| 6,006,593 A * | 12/1999 | Yamanaka .................. 73/105 |
| 6,263,733 B1 | 7/2001 | Baldwin et al. |
| 6,289,143 B1 * | 9/2001 | Berthold et al. ............. 385/12 |
| 6,779,402 B1 * | 8/2004 | Rud et al. ................ 73/514.26 |
| 6,789,424 B1 * | 9/2004 | Knudsen et al. ......... 73/514.26 |
| 6,886,404 B1 * | 5/2005 | Digonnet et al. ........ 73/514.27 |
| 2001/0022585 A1 | 9/2001 | Hirano et al. |

FOREIGN PATENT DOCUMENTS

| | | |
|---|---|---|
| WO | WO 97/49578 | 12/1997 |

* cited by examiner

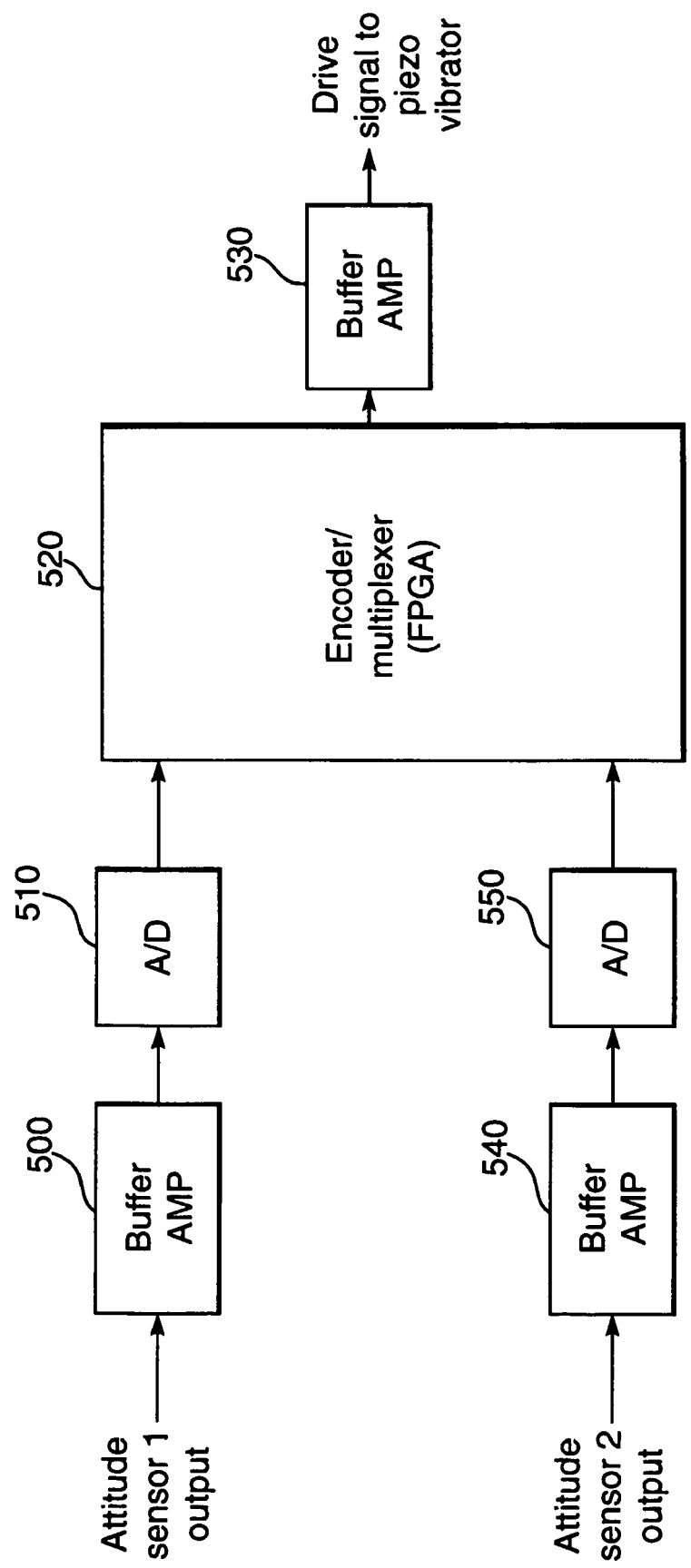

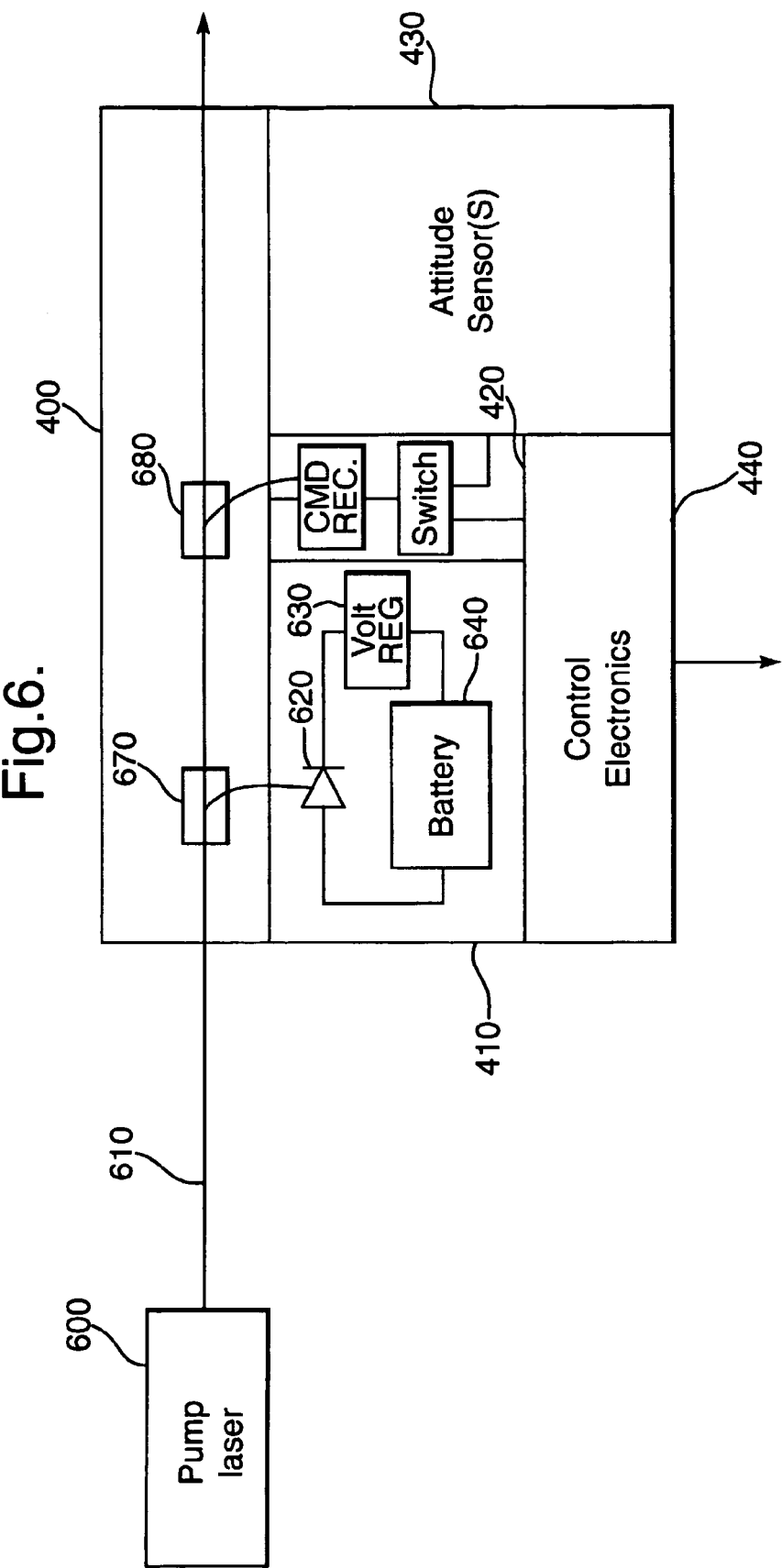

ATTITUDE SENSOR

FIELD OF THE INVENTION

The present invention relates to an attitude sensing device and an attitude sensing method, and in particular to techniques for determining an attitude in three dimensional space of a reference axis of a package containing a fibre optic sensor.

DESCRIPTION OF THE PRIOR ART

Fibre optic sensors are becoming a well-established technology for a range of applications, for example geophysical applications. Fibre optic sensors can take a variety of forms. For example fibre optic sensors may be arranged to act as static pressure sensors or static temperature sensors. Additionally, fibre optic sensors have also been developed for measuring dynamic quantities such as acoustic and seismic signals, example of such dynamic fibre optic sensors being fibre optic hydrophones and fibre optic geophones. A hydrophone is a device for the measurement of dynamic pressure in a fluid, whilst a geophone is a device for the measurement of vibration (in practice, this can either be an accelerometer or a displacement sensor).

An example of an application in which dynamic fibre optic sensors are now seeing use is in the oil/gas industry. In particular, it has been recognised by the industry that fibre optic sensors have a major role to play in the rapidly growing area of monitoring of oil or gas reservoirs, such an activity often being referred to as reservoir characterisation.

In such applications, arrays of sensors are typically used, the array consisting of a series of sensor packages. The actual arrangement of sensors placed within each package is obviously a matter of design choice, but typically each package will include up to three orthogonally mounted geophones (directional vibration sensors) and one hydrophone (omnidirectional pressure sensor). These packages are often known as 4-C (4-component) packages, and one array may contain more than a thousand such packages.

In an example deployment, such an array of hydrophones and/or geophones may be spread out along a seabed for monitoring of oil or gas reservoirs within the seabed. To carry out reservoir characterisation, a separate acoustic source is used to transmit seismic signals into the oil field structure, and the array of sensors is used to record the signals reflected from the various geological layers within the structure.

To interpret the signals generated by the sensors in the array as a result of such a process, it is important to know the orientation of each package, and hence the orientation of the sensors within each package, and in typical deployment conditions, this can be difficult. For example, when such an array is deployed onto the seabed, it is difficult to predict how the packages will settle on to the seabed, and so the orientation of each package in three dimensional space is not in general known.

To accurately extract the seismic signal, either the sensors must be positioned so that they are in a constant position with respect to the earth's gravitational field, which would involve the use of mechanical gimbals or the like to ensure that each package is orientated in a predetermined way, or the orientation of the sensors must be precisely known, which would typically involve the use of an attitude (or tilt) sensor. A variety of electro-mechanical attitude sensors exist, for example accelerometers, mercury tilt meters, Micro-Electro-Mechanical Systems (MEMS) devices, etc.

The use of mechanical gimbals can significantly increase the complexity and size of each sensor package, and in certain deployments has been found to be unreliable. Accordingly, it is generally desirable to use attitude sensors to determine the attitude, or orientation, of each package.

Up until recently, most existing seismic arrays use geophones and hydrophones based on electroacoustic technology, rather than fibre optic technology, and the outputs from these sensors were multiplexed onto a databus using local electronics for onward transmission. The outputs from the electro-mechanical attitude sensors were normally multiplexed onto the databus in the same way. The multiplexing system required electrical power to be supplied through a cable to each package.

However, as mentioned above, in more recent times there has been much interest in the use of fibre optic sensors instead of the more traditional electroacoustic sensors. One example is the so called interferometric fibre optic hydrophone or geophone, which operates by converting an acoustic or seismic signal into a strain in a coil of optical fibre. This strain imposes a phase change in an optical signal propagating through the coil, due to a combination of the physical length change in the fibre and the stress-optic effect. In one interrogation scheme, this phase change is detected by beating this signal with a reference signal of a slightly different frequency which results in the production of a beat frequency, or heterodyne carrier, equal to the difference in frequency of these two signals. The acoustic signal will therefore appear as a phase modulation on this carrier. It will be appreciated that other interrogation schemes may also be used, for example a Phase Generated Carrier scheme, which is homodyne based.

An example of a publication which discusses the prospect of using fibre optic hydrophones and geophones for geophysical applications is an article entitled "Large Scale Multiplexed Fibre-Optic Arrays for Geophysical Applications" by Philip J Nash et al, Proceedings of SPIE (International Society for Optical Engineering), Industrial Sensing Systems, 5–6 Nov. 2000, Boston, USA, Pages 55 to 65.

The advantage of an all optical approach is that no local multiplexing electronics or electrical power is required within the packages to enable the fibre optic sensors to operate, as the optical outputs are all passively multiplexed within the array, for instance using time and/or wavelength division multiplexing.

Accordingly, in an ideal situation, the attitude sensing of each package should also be carried out with an optical sensor which can be fitted into the same multiplexing scheme. However, at the current time, no all optical attitude sensors with the required performance are deemed to currently exist. Hence, whilst it is clear that an all optical seismic seabed array of fibre optic sensors will require attitude sensors, none of the existing all-optical attitude sensors are likely to give the required performance. Existing electro-mechanical attitude sensors will give the required performance, but require their own multiplexing and data transmission system, which will require a dedicated data link for the attitude sensors, together with a supply of electrical power to each of the packages to drive the electronic attitude sensors. This would clearly increase cabling requirements within the arrays, add significantly to their complexity, and detract from the general perceived benefits described above of using an array consisting of fibre optic sensors.

Accordingly, it would be desirable to provide an attitude sensing device for a package containing a fibre optic sensor which does not require its own multiplexing and data transmission system, and which will accordingly enable the benefits of an all-optical array of fibre optic sensors to be realised.

SUMMARY OF THE INVENTION

Viewed from a first aspect, the present invention provides an attitude sensing device for determining an attitude of a reference axis of a package containing a fibre optic sensor, comprising: an electro-mechanical attitude sensor for generating an electrical signal indicative of the attitude of that attitude sensor; and converter logic for converting the electrical signal into a stimulus signal; the fibre optic sensor being responsive to the stimulus signal to cause a variation in at least one predetermined property of an optical signal transmitted through the fibre optic sensor, the attitude of the reference axis being determinable from the variation of the predetermined property.

In accordance with the present invention, an attitude sensing device is provided with an electro-mechanical attitude sensor which enables the required accuracy and performance in attitude sensing to be achieved. However, rather than providing a dedicated data link for the attitude sensor to enable the attitude sensor's reading to be output, converter logic is provided within the attitude sensing device for converting the electrical signal output by the electro-mechanical attitude sensor into a stimulus signal. This stimulus signal is of a type which the fibre optic sensor within the package is sensitive to, and accordingly the fibre optic sensor is responsive to the stimulus signal to cause a variation in at least one predetermined property of an optical signal transmitted through the fibre optic sensor. The stimulus signal is encoded such that the attitude of the reference axis of the package is determinable from the variation of the predetermined property of the optical signal.

By this approach, the measurement made by the electro-mechanical attitude sensor is converted into a form where it is output using the standard mechanism provided for transmitting the outputs of the fibre optic sensor itself, and hence completely avoids the requirement to provide a dedicated data transmission system to carry the output signal from the attitude sensor. Typically, the signals generated by the fibre optic sensor within the package are output over a fibre optic cable, and in accordance with the present invention the output of the electro-mechanical attitude sensor is also converted into a form where it can be output by the fibre optic sensor over the fibre optic cable.

Hence, in summary, the present invention provides a high performance, low cost, reliable technique for integrating existing electro-mechanical attitude sensors within a package containing a fibre optic sensor by interfacing the attitude sensor with the existing all-optical seismic sensor and data transmission system. This then enables an array of packages to be produced to form a fully fibre optic array.

It will be appreciated that the optical signal transmitted through the fibre optic sensor can take a variety of forms, and may for example be in the visible, ultraviolet, or infrared range. In preferred embodiments, the optical signal is an infrared signal. Further, it will be appreciated by those skilled in the art that the predetermined property of the optical signal which is varied in dependence on the received stimulus signal may also take a variety of forms, dependent on the construction of the fibre optic sensor, and for example may be phase, amplitude, polarisation, etc. In preferred embodiments, the predetermined property is phase.

In preferred embodiments, to avoid the requirement to supply electrical power to the package purely to power the eelectro-mechanical attitude sensor, the attitude sensing device is provided with a local power source which is used to drive both the electro-mechanical attitude sensor and the converter logic.

It will be appreciated that the local power source could be of any suitable form, so long as it provides for the generation of the necessary electrical power within the attitude sensing device. Hence, the local power source could be provided by a battery, or alternatively could be a device which generates electrical power based on a received stimulus, for example optical power generated remotely and sent to the attitude sensing device for conversion into electrical power.

As discussed earlier, the fibre optic sensor may take a variety of forms, and the type of stimulus signal generated by the converter logic will depend on the type of fibre optic sensor included within the package. However, in preferred embodiments, the fibre optic sensor is a vibration sensor, and the converter logic comprises: control logic for generating a drive signal dependent on the electrical signal generated by the electro-mechanical attitude sensor; and a vibration source for receiving the drive signal and generating as the stimulus signal a sequence of vibrations dependent on the drive signal; whereby the fibre optic vibration sensor is responsive to the sequence of vibrations to cause the variation in the at least one property of the optical signal. The term "vibration sensor" as used herein is intended to broadly cover any fibre optic sensor which is sensitive to vibrations, and hence, for example, the vibration sensor may be a geophone used to detect directional vibration (for example an accelerometer or a displacement sensor), or a hydrophone which is sensitive to omnidirectional vibrations in order to generate pressure information.

It will be appreciated by those skilled in the art that the drive signal generated by the control logic may take a variety of forms dependent on how the sequence of vibrations is to encode the attitude measurement. For example, the sequence of vibrations from the vibration source may be encoded digitally, such that a predetermined sequence of ones and zeros are used to encode the attitude measurement. In such cases, the drive signal will clearly cause the vibration source to be turned on and off in a predetermined sequence. However, alternatively, the sequence of vibrations from the vibration source may be encoded using vibrations of varying amplitude, and in such cases the drive signal will typically be of a variable voltage used to control the amplitude of vibration of the vibration source at any particular point in time. A further alternative is for the sequence of vibrations from the vibration source to be encoded using vibrations of varying frequency, and in such cases it is clear that the drive signal generated by the control logic will specify the frequency of vibration to be generated by the vibration source at any particular point in time. Yet another alternative is for the sequence of vibrations from the vibration source to be encoded using vibrations of varying duration, in which case the drive signal will be arranged to turn the vibration source on and off for predetermined periods of time dependent on the attitude measurement. It will be appreciated by those skilled in the art that there will indeed be further alternative ways of encoding the sequence of vibrations generated by the vibration source, and the above are intended merely to provide examples of suitable implementations.

In preferred embodiments of the invention, the control logic is arranged to generate a drive signal which is directly indicative of the attitude of the attitude sensor as indicated by the electrical signal output from the attitude sensor, such that the variation in the predetermined property of the optical signal is directly indicative of the attitude measured by the attitude sensor. Since the orientation of the attitude sensor within the package will be fixed at manufacture, there will clearly be a direct relation between the attitude of the attitude sensor and the attitude of the reference axis of the package, and accordingly it is clear that the attitude of the reference axis can readily be determined from the measured attitude of the attitude sensor. Indeed, in preferred embodiments the attitude sensor will actually be aligned along the reference axis, such that the attitude of the attitude sensor equates directly to the attitude of the reference axis.

However, in situations where the attitude of the attitude sensor does not directly equate to the attitude of the reference axis, the control logic of some embodiments may be arranged to perform a calculation of the attitude of the reference axis based on the electrical signal received from the attitude sensor indicative of the attitude of the attitude sensor, and to then generate a drive signal which is directly indicative of the attitude of the reference axis. However, in preferred embodiments, it is desirable to keep the complexity of the control logic to a minimum, and hence it is envisaged that the control logic of preferred embodiments will generate a drive signal which corresponds directly to the electrical signal generated by the attitude sensor, and hence causes a sequence of vibrations, and ultimately the variation of the predetermined property of the optical signal, to be dependent on the attitude of the attitude sensor. If any alteration of that attitude value is required in order to arrive at the attitude of the reference axis, it is envisaged that in preferred embodiments this would be done by external processing logic, for example processing logic to which an array of such packages is coupled.

It will be appreciated by those skilled in the art that the vibration source could take a variety of forms. However, in preferred embodiments the vibration source is a piezoelectric vibrator or electric motor. Alternatively, the vibration source could be an electrostrictive vibrator, a magnetostrictive vibrator, etc.

As mentioned earlier, the fibre optic sensor may take a variety of forms, and in preferred embodiments there will typically be more than one fibre optic sensor within the package, and indeed more than one type of fibre optic sensor within the package. However, in preferred embodiments, the fibre optic sensor within the package which responds to the stimulus signal generated by the converter logic is a geophone. In practice, this converter logic will be positioned in the vicinity of the fibre optic sensor responding to the stimulus signal, and it is generally more desirable for that fibre optic sensor to be a geophone, since a hydrophone needs to be located in fluid contact with the fluid whose pressure is being measured, and hence is often located in a harsher environment than the geophones.

Preferably, the power source takes the form of a battery, which may or may not be rechargeable, depending on, for example, the planned deployment environment. However, in preferred embodiments, the battery is rechargeable, and the attitude sensing device further comprises an opto-electronic converter coupled to the battery, and arranged to receive an optical charge signal transmittable to the opto-electronic converter via an optical fibre, the opto-electronic converter being responsive to the optical charge signal to generate a current used to charge the battery. As mentioned earlier, a typical deployment application will involve the use of an array of packages connected by fibre optic cables. By the above approach, one of the optical fibres can be used for the transmission of power to the attitude sensing device to enable the battery to be trickle charged. In preferred embodiments, the opto-electronic converter is a photodiode coupled across the terminals of the battery.

Depending upon the deployment of the package, only a single measurement of attitude may be required, for example immediately after deployment, or alternatively attitude measurements may be required at predetermined intervals. Typically, in deployments such as the seismic seabed array deployment mentioned earlier, the intervals between measurements may be quite large, and for example measurements of attitude might be taken at approximately yearly intervals, to ensure that no significant changes in attitude of any of the sensors is occurring.

Hence, in one embodiment, the attitude sensing device may further comprise a timer for determining when to switch on the attitude sensor to cause the electrical signal indicative of the attitude to be generated. This simple implementation may be sufficient for many applications. However, if more control is required as to when to take attitude measurements, the attitude sensing device may be provided with a receiver for receiving a command signal, the receiver being responsive to the command signal to switch on the attitude sensor to cause the electrical signal indicative of the attitude to be generated. By this approach, the attitude sensor can be turned on as and when required.

However, given the earlier discussions, it would clearly be desirable to avoid the need to provide any dedicated cabling to the attitude sensing device merely to enable the command signal to be passed to the receiver. Accordingly, in one embodiment, the command signal may be formed as a predetermined vibration sequence, and the receiver may be formed by the vibration source, the vibration source being further arranged to convert the received command signal into an electrical signal used to switch on the attitude sensor. Hence, in such embodiments, the vibration source has a bi-directional operation, such that it can convert an electrical signal (i.e. the drive signal) into a vibration sequence, and conversely convert vibrations into a suitable electrical signal to be routed to the attitude sensor to turn it on and off.

Alternatively, the receiver could be formed by a separate device to the vibration source, for example a separate electroceramic hydrophone, or a geophone.

In an alternative embodiment, the receiver may be formed by an optical receiver, and the command signal may be formed as an optical command signal transmittable to the optical receiver via an optical fibre. In such cases, the optical receiver will be arranged to convert the optical command signal into an electrical signal to be sent to the attitude sensor to turn it on and off. In preferred embodiments where the battery is also trickle charged via an optical charge signal passed through an optical fibre, that same optical fibre may also be used for the transmission of the optical command signal to the optical receiver.

Whilst one electro-mechanical attitude sensor may be sufficient in certain deployments, a more complete determination of the attitude of the reference axis may be made by including an additional electro-mechanical attitude sensor. Accordingly, in preferred embodiments, the attitude sensing device further comprises a further electro-mechanical attitude sensor for generating an electrical signal indicative of the attitude of that further attitude sensor, the further attitude sensor being mounted at an angle with respect to the attitude sensor, the converter logic being arranged to receive the electrical signals from both attitude sensors, and to generate a single drive signal dependent on those electrical signals which is used to generate the sequence of vibrations. In one preferred embodiment, the electro-mechanical attitude sensors are orthogonally mounted with respect to each other.

In preferred embodiments, a coding scheme is used for the sequence of vibrations from the vibration source such that the attitude of each attitude sensor is represented independently within the sequence of vibrations. As an example, the coding scheme may be a time division multiplex scheme. However, it will be appreciated by those skilled in the art that alternatively coding schemes may be used, for example frequency division, etc.

In an alternative embodiment, the converter logic may be arranged to perform some processing on the electrical signals from both attitude sensors, in order to determine the attitude of the reference axis, and in that event the single drive signal generated will be used to generate a stimulus signal which is directly indicative of the attitude of the reference axis.

Viewed from a second aspect, the present invention provides a package comprising one or more fibre optic sensors and an attitude sensing device in accordance with the first aspect of the present invention.

Viewed from a third aspect, the present invention provides an array of packages coupled by a fibre optic cable, each package comprising one or more fibre optic sensors coupled to the fibre optic cable, and an attitude sensing device in accordance with the first aspect of the present invention.

Viewed from a fourth aspect, the present invention provides a method of determining an attitude of a reference axis of a package containing a fibre optic sensor, comprising the steps of: (i) employing an electro-mechanical attitude sensor within the package to generate an electrical signal indicative of the attitude of that attitude sensor; (ii) converting, within the package, the electrical signal into a stimulus signal; (iii) arranging the fibre optic sensor to be responsive to the stimulus signal to cause a variation in at least one predetermined property of an optical signal transmitted through the fibre optic sensor; and (iv) determining the attitude of the reference axis from the variation of the predetermined property.

BRIEF DESCRIPTION OF THE DRAWINGS

The present invention will be described further, by way of example only, with reference to preferred embodiments thereof as illustrated in the accompanying drawings, in which:

FIG. 5 is a block diagram illustrating the components of the control electronics illustrated in FIG. 4; and FIG. 6 is a block diagram illustrating more details of the attitude sensing device of preferred embodiments of the present invention.

DESCRIPTION OF PREFERRED EMBODIMENTS

Figure 1:
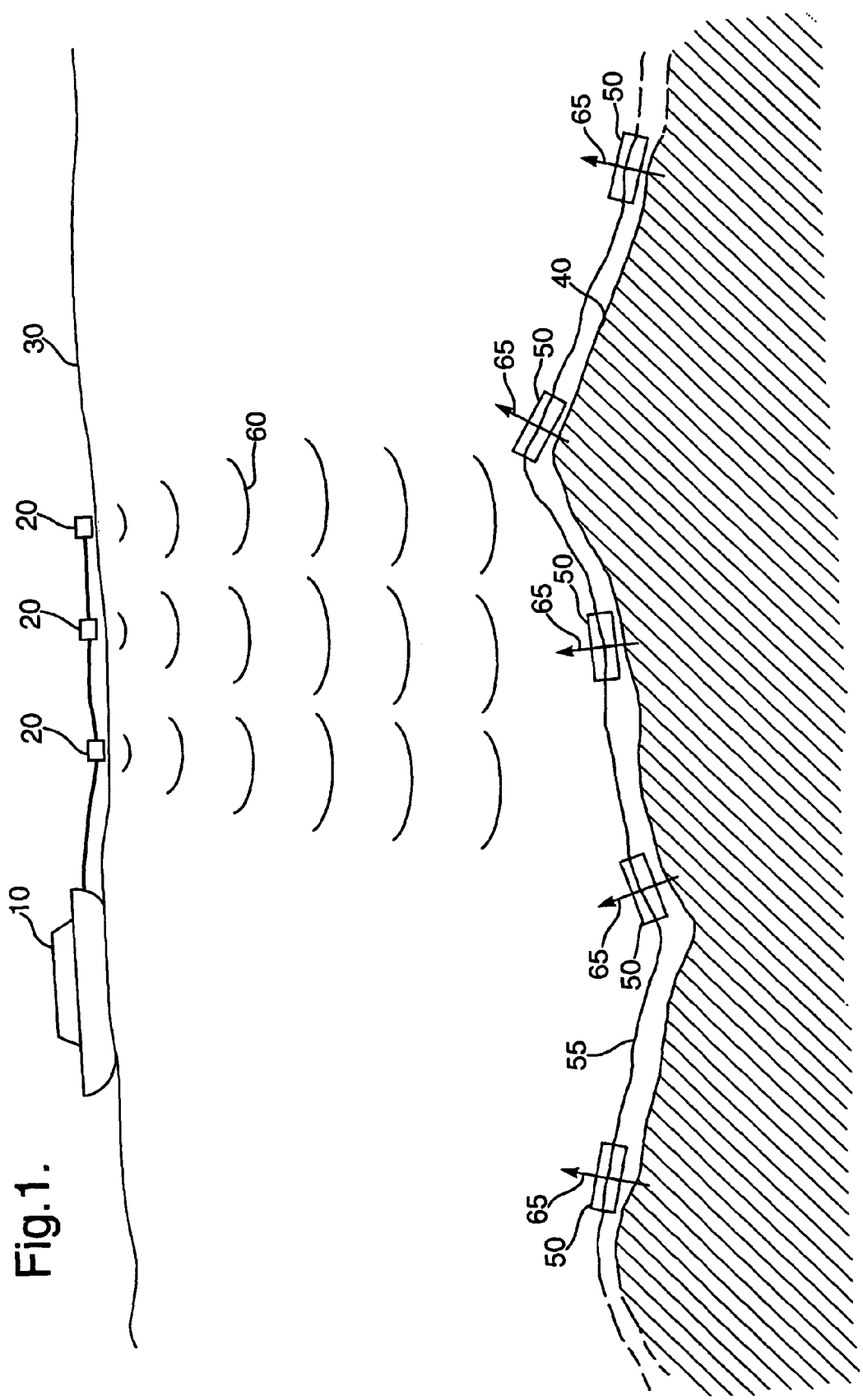
FIG. 1 is a diagram illustrating a deployment of a seismic seabed array of an embodiment of the present invention.

FIG. 1 is a diagram illustrating a deployment of a fibre optic seabed seismic array in accordance with an embodiment of the present invention. The array consists of a plurality of packages 50 coupled by a fibre optic cable 55. The array is deployed on the seabed 40, and depending on the depth of the seabed 40 below the sea surface 30, this deployment may be performed by divers positioning each package 50 on the seabed, or by the use of submersible vehicles to perform such positioning, or the array may be directly deployed from the surface without assistance at the seabed.

Attached to one end of the fibre optic cable 55 will be an optical signal source such as a laser for propagating an optical signal along the fibre optic cable 55, and some receive circuitry for detecting the signals returned from the sensors within each of the packages 50. This optical signal source and receive circuitry is not illustrated in FIG. 1, but would typically be located at some convenient location, for example a boat, oilrig, etc located on the sea surface 30.

When it is desired to carry out a reservoir characterisation measurement, one or more acoustic sources 20 are used to transmit acoustic signals 60 into the seabed structure 40, and the array of packages 50 are used to record the signals reflected from the various geological layers within the seabed structure 40. Typically a plurality of acoustic sources 20 are used during such measurements, and may for example be trailed behind a boat 10 on the sea surface 30.

The operation of the optical fibre sensors within each package 50 will be well understood by those skilled in the art, and hence will not be discussed in detail herein. However, a brief discussion of the operation of the hydrophones and geophones which may be deployed within each package 50 will now be provided with reference to FIGS. 2 and 3.

Figure 2:
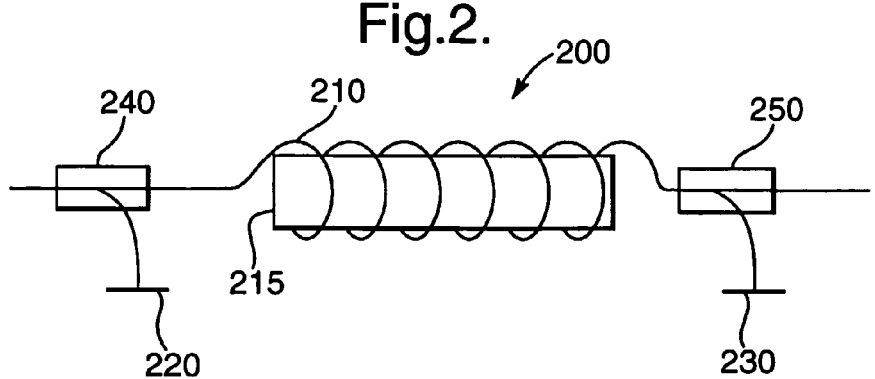
FIG. 2 is a diagram illustrating the configuration of a fibre optic hydrophone.

FIG. 2 shows an example of an interferometric fibre optic hydrophone 200 which may be used to detect pressure, and in particular in the deployment of FIG. 1, the pressure of the seawater adjacent the hydrophone. The hydrophone 200 basically consists of an optical fibre 210 wound around a mandrel 215 such as an air-backed mandrel. An array of these coils may be spliced together, separated by a directional coupler 240, 250 with a reflective mirror 220, 230 attached to one port. The other port of the coupler is index matched such that reflection of an optical signal passing along the optical fibre 210 only occurs in one direction, ensuring that multi-path reflections are suppressed.

The fibre optic hydrophone 200 operates by converting an acoustic or seismic signal 60 into a strain in the coil of optical fibre 210. This imposes a phase change in an optical signal propagating through the coil 210, due to a combination of the physical length change in the fibre and the stress-optic effect. This phase change is detected by beating the signal with a reference signal of a slightly different frequency which results in the production of a beat frequency, or heterodyne carrier, equal to the difference in frequency of these two signals. The acoustic signal will therefore appear as a phase modulation on this carrier. It will be appreciated by those skilled in the art that other interrogation techniques, such as Phase Generated Carrier, could also be applied.

As will also be appreciated by those skilled in the art, various architectures have been proposed for enabling a plurality of such hydrophones to be spliced serially together, and for the individual signals from each hydrophone to be detected. For example time division multiplexed (TDM) architectures have been proposed, and in addition combined time and wavelength division multiplexing architectures have been proposed. Both of these approaches are discussed in some detail in the article entitled "Large Scale Multiplexed Fibre-Optic Arrays for Geophyiscal Applications" by Philip J Nash et al, Proceedings of SPIE (International Society for Optical Engineering), Industrial Sensing Systems, 5–6 Nov. 2000, Boston, USA, Pages 55 to 65. Suitable multiplexing techniques are also discussed in PCT patent application no. PCT/GB00/01300 (publication no. WO 00/62021).

It will be appreciated that FIG. 2 illustrates just one example of a fibre optic hydrophone that may be used within the packages 50, and it will be appreciated by those skilled in the art that other arrangements of fibre optic hydrophone can be used.

Figure 3A:
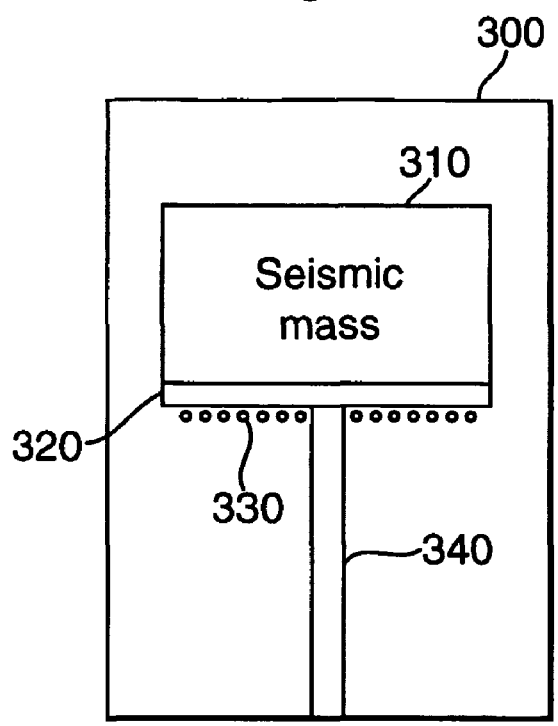
FIGS. 3A and 3B are diagrams illustrating the configuration of a fibre optic geophone.
Figure 3B:
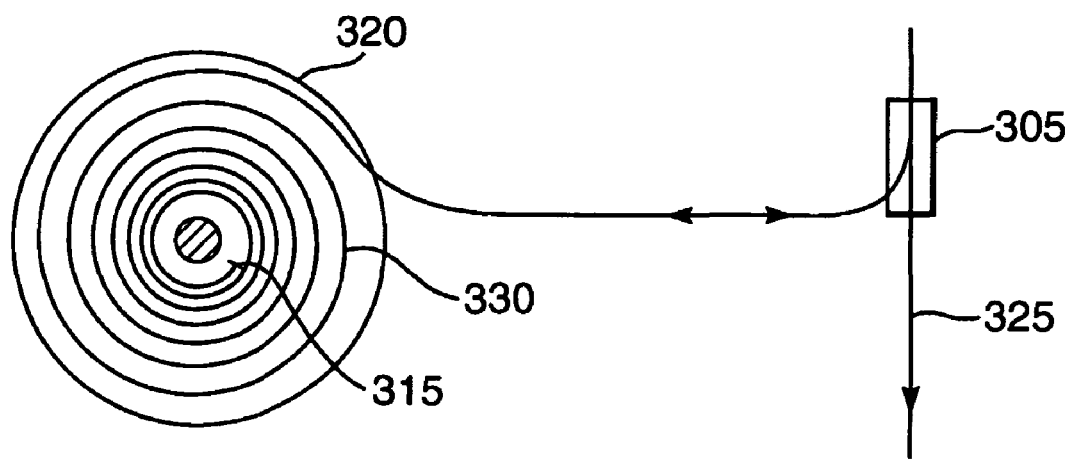

FIGS. 3A and 3B illustrate an example of a fibre optic geophone which can be used to detect directional vibration. The geophone basically consists of a seismic mass 310 located on a flexible plate 320 within an enclosure 300. The flexible plate 320 is rigidly connected to the enclosure 300 by a support member 340, which in the example of FIG. 3A is shown as being connected to the middle of the flexible plate. An optical fibre coil 330 is then wound onto at least one side of the flexible plate 320 in the manner illustrated in FIG. 3B, which is a view showing the underside of the flexible plate 320.

As shown in FIG. 3B, a proportion of an optical signal passing through optical fibre 325 is passed into the optical fibre coil 330 of the geophone via a coupler 305. At the inner end of the coil 330, a reflective end 315 is provided, which causes the optical signal to be reflected back through the coil and back onto the main optical fibre 325 via the coupler 305.

As will be appreciated by those skilled in the art, vibrations along the axis of the support member 340 will cause the flexible plate 320 to flex due to the presence of the seismic mass 310, this flexing causing a strain in the fibre optic coil 330, which in a similar manner to the earlier described hydrophone will impose a phase change in an optical signal propagating through the coil 330. As will be appreciated by those skilled in the art, similar techniques as those discussed earlier with respect to the hydrophone of FIG. 2 are used to detect this phase change and hence determine the vibrations experienced by the geophone 300.

As will be appreciated by those skilled in the art, geophones such as those illustrated in FIGS. 3A and 3B can be spliced together using appropriate directional couplers, and indeed in a typical package 50 there will typically be three orthogonally mounted geophones 300 all connected to the same optical fibre to enable directional vibration measurements to be taken in three orthogonal directions.

As discussed earlier, when deploying packages 50 containing one or more fibre optic sensors, it is important to know the orientation of each individual package in order to be able to correctly analyse the signals output by the fibre optic sensors within the package. In many deployments, such as the deployment illustrated in FIG. 1, it is difficult to predict the orientation of the packages 50, and accordingly an attitude sensor may be required for each package in order to generate a signal indicative of the attitude of each package 50, and hence the attitude of the various sensors within the package.

Figure 4:
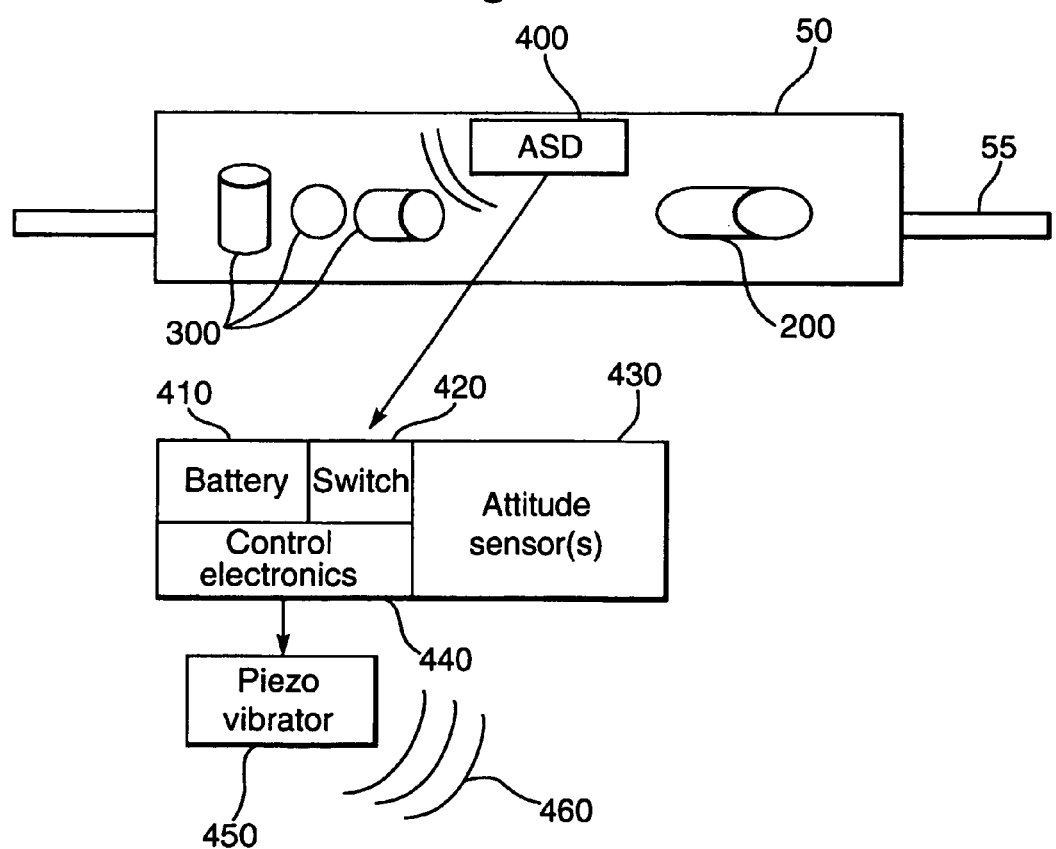
FIG. 4 is a diagram schematically illustrating a package incorporating fibre optics sensors and an attitude sensing device in accordance with preferred embodiments of the present invention.

FIG. 4 is a diagram illustrating a package 50 incorporating an attitude sensing device in accordance with preferred embodiments of the present invention. As shown in FIG. 4, a package 50 may in preferred embodiments contain three orthogonally mounted geophones 300, and one hydrophone 200, with the package 50 being coupled to other packages via a fibre optic cable 55. Although the hydrophone 200 is shown entirely within the package 50, it will be appreciated that it will physically need to be located in fluid contact with the sea water to enable the pressure to be measured.

The orientation of the geophones and hydrophone within the package 50 will be fixed, but in order to determine the orientation or attitude of each such fibre optic sensor, it is first necessary to know the attitude of a reference axis 65 of the package 50 within three dimensional space. In preferred embodiments, this determination is enabled by the presence of the attitude sensing device 400 within the package 50.

The attitude sensing device 400 of preferred embodiments preferably consists of one or more electro-mechanical attitude sensors 430, which may be provided by any one of a number of known electro-mechanical attitude sensors, for example accelerometers, mercury tilt meters, MEMS devices, etc. The attitude sensor 430 will generate an electrical signal indicative of the attitude of that attitude sensor, which is input to control electronics 440, which are used in preferred embodiments to generate a drive signal for a piezoelectric vibrator 450 dependent on the electrical signal received from the attitude sensor 430. The piezoelectric vibrator 450 is responsive to the drive signal to generate a sequence of vibrations 460 which are then detected by one of the fibre optic sensors 200, 300 within the package 50. Those vibrations will then be converted by the fibre optic sensor 200, 300 into a strain in the coil of optical fibre within that fibre optic sensor, resulting in a phase change in an optical signal propagating through the coil, which is indicative of the attitude measurement. By this mechanism, it will be appreciated that it is possible to output the attitude measurement from the electro-mechanical attitude sensor 430 using the standard fibre optic cable 55 connected to the package 50. This removes the need to provide a separate dedicated data transmission system to enable the output of the electro-mechanical attitude sensor to be output to the receiver and processing stages located at the far end of the optical fibre cable 55.

In preferred embodiments, the attitude sensor 430 and control electronics 440 are powered by a local battery 410 provided within the attitude sensing device 400. Further, in preferred embodiments, a switch 420 is provided for switching on the attitude sensor 430 and control electronics 440 at predetermined intervals, or in response to a command signal. More details of the battery 410 and switch 420 of preferred embodiments will be described later with reference to FIG. 6.

In preferred embodiments, the piezoelectric vibrator 450 is preferably positioned next to one of the fibre optic sensors 200, 300, and in preferred embodiments is located next to one of the geophones 300. In practice, location of the piezoelectric vibrator 450 next to the hydrophone 200 is less desirable, since the hydrophone typically needs to be connected in fluid contact with the fluid whose pressure is being measured, for example the sea in the FIG. 1 implementation, and this is a more hostile environment than that to which the geophones 300 are exposed, since the geophones 300 can be located entirely within the package 50 and sealed from the sea.

In preferred embodiments, two electro-mechanical attitude sensors, positioned orthogonally with respect to each other, are provided within the attitude sensing device 400, as this enables a more complete measurement of attitude to be determined for some types of attitude sensor. For example, certain types of attitude sensor may lose accuracy (or stop working altogether) after a certain tilt angle is exceeded, and hence the use of two sensors increases the range of angles over which the attitude can be measured. Further, in preferred embodiments, these two attitudes sensors are located adjacent to one of the geophones, with the piezoelectric vibrator 450 of the attitude sensing device 400 being arranged to generate vibrations in the direction to which that geophone is sensitive.

More details of the control electronics 440 used in preferred embodiments where two attitude sensors 430 are provided will now be discussed with reference to FIG. 5.

As shown in FIG. 5, the output from each attitude sensor 430 is passed to a corresponding buffer amplifier 500, 540, which can buffer that output and then amplify it prior to passing the amplified version of the attitude sensor's output signal to a corresponding analogue to digital (A/D) converter 510, 550. The outputs from the analogue to digital converters 510, 550 are then passed to an encoder/multiplexer unit 520, which is preferably provided by a digital signal processor (DSP). In a particular preferred embodiment, the digital signal processor takes the form of a field programmable gate array (FPGA) which is arranged to generate a suitable drive signal for the piezoelectric vibrator 450 dependent on the two input signals from the attitude sensors.

It will be appreciated that the encoder/multiplexer unit 520 may be arranged to perform any suitable encoding. For example, since the relative orientation of each attitude sensing device with respect to the reference axis of the package will be predetermined, it is possible that the encoding/multiplexing unit could be arranged to determine from the received signals the actual attitude of the reference axis, and to directly encode that reference axis attitude in the output drive signal. However, in preferred embodiments, it is desirable to keep the complexity of the encoding/multiplexing unit 520 to a minimum, and so instead the encoding/multiplexing unit 520 generates two encoded signals corresponding to the two received signals from the attitude sensors, and then uses a coding scheme such as time division multiplexing, frequency division multiplexing, etc, in order to generate a single drive signal to be used to drive the piezoelectric vibrator. In preferred embodiments, the single drive signal is output to a buffer amplifier 530, which can buffer that output drive signal, and then amplify it prior to providing it to the piezoelectric vibrator 450.

It will also be appreciated that there are a number of ways in which the encoder/multiplexer 520 could encode the signals received from the attitude sensors. For example, the outputs from each attitude sensor could be encoded either digitally or in analogue form. In preferred embodiments, the signals are encoded in digital form in order to produce two ten bit digital signals, each ten bit signal encoding the attitude of the corresponding attitude sensor. These two ten bit digital signals are then coded using time division or frequency division multiplexing techniques to generate a single drive signal for the piezoelectric vibrator, which will cause the piezoelectric vibrator 450 to turn on and off dependent on the digital output signal from the encoder/multiplexer unit 520.

As an alternative to encoding the output signals from each attitude sensor in a digital form, the encoder/multiplexer 520 may be arranged to encode each signal in an analogue form, and hence as an example may generate drive signals which cause the sequence of vibrations subsequently produced by the piezoelectric vibrator 450 to have varying amplitude, varying frequency, varying duration, etc, dependent on the attitude measured by each attitude sensor.

In the above example, it is assumed that the output from each of the attitude sensors is generated in an analogue form. In general, this may be a simple analogue voltage with a level dependent on the tilt of the attitude sensor. However, in some embodiments, the analogue output may have a more complex form, or alternatively the attitude sensors may be arranged to directly generate a digital output. In the event that the attitude sensors generate digital outputs, it will be clear that the A/D converters 510, 550 will no longer be required. It will be appreciated that the encoder/multiplexer unit 520 will need to be designed to handle the particular data format generated by the attitude sensors. Further, it will be appreciated that, irrespective of whether the outputs generated by the attitude sensors are in analogue or digital form, the drive signal(s) generated by the control electronics 440 can be either in an analogue or a digital form depending on the vibrator 450 to be driven.

FIG. 6 is a diagram illustrating in more detail the construction of the battery unit 410 and the switch unit 420 of preferred embodiments. In preferred embodiments, the battery unit 410 incorporates a rechargeable battery 640 which has a photodiode 620 coupled across its terminals in series with a voltage regulator 630. An optical fibre 610 within the optical fibre cable 55 can then be used as a "charging fibre" to generate an optical charge signal which is routed via a directional coupler 670 to the photodiode 620 in order to cause the generation of a current to trickle charge the battery 640. In preferred embodiments, this optical charge signal used to recharge the battery is generated by a pump laser 600. Typically, this pump laser 600 will be a different laser to the one used to generate the optical signal passed through the geophones and hydrophones.

As regards the switch 420, this may take a variety of forms. For example, it may merely involve a switch being coupled to a timer, such that when the timer expires, the switch couples the attitude sensor and control electronics to the battery in order to cause an attitude measurement to be taken. However, in preferred embodiments the switch unit 420 includes a switch 660 which is connected to a command receiver 650. The command receiver 650 is an optical receiver (in preferred embodiments incorporating a photodiode) which is arranged to receive an optical command signal transmitted over the optical fibre 610, and routed to the command receiver 650 via a coupler 680. The optical command signal would typically comprise a particular sequence of optical pulses used to trigger the command receiver 650 to output an electrical signal to the switch 660 to cause the switch to couple the battery 640 to the attitude sensor(s) 430 and the control electronics 440. In preferred embodiments, the same optical fibre 610 can be used for transmission of the optical charge signal to the photodiode 620 and the optical command signal to the command receiver 650. Furthermore, by use of appropriate couplers 670, 680, the optical fibre 610 may pass through multiple packages, and in particular through the attitude sensing devices of multiple packages in order to provide appropriate signals to the battery 410 and switch 420 units of those attitude sensing devices, the various signals being multiplexed in an appropriate manner, e.g. time division, frequency division, etc.

In an alternative embodiment, instead of transmitting the optical command signal along the same optical fibre as used to carry the optical charge signal, the optical command signal could be transmitted along the telemetry optical fibre used by the hydrophones and geophones at a wavelength different to the hydrophone/geophone interrogation unit, and then "tapped off" from this fibre using a wavelength division multiplexing (WDM) coupler. As an example, if the hydrophones and geophones are interrogated at 1550 nm, it may be possible to send the optical command signal at 1480 nm, and use a 1480/550 nm WDM coupler to tap the optical command signal off to the command receiver 650 illustrated in FIG. 6.

As an alternative to the command receiver 650, the piezoelectric vibrator 450 of FIG. 4 may actually be a bi-directional device, which can either convert the electrical drive signal from the control electronics 440 into a vibration sequence 460, or instead can receive a command signal in the form of a vibration command signal, and convert that into an electrical signal to send to the switch 660 to turn on the attitude sensor(s) 430 and the control electronics 440. Alternatively the command signal may be received by a separate, dedicated acoustic or seismic receiver.

Accordingly, it can be seen that the attitude sensing device of preferred embodiments of the present invention alleviates the earlier described problems of attitude sensing in all-optical arrays, with a minimum of additional electronics and data transfer requirements. This avoids the requirement to use a complex optical attitude sensor which may give lower performance, or the provision of a separate data transmission system which would typically otherwise be required if electro-mechanical attitude sensors were used. The approach of the preferred embodiment uses the existing fibre optic sensors, telemetry and multiplexing system to recover the information from conventional electro-mechanical attitude sensors. The approach of the preferred embodiment of the present invention enables an attitude sensing device to be provided in fibre optic sensor packages which is of lower cost and higher reliability than other known attitude sensing techniques.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

The invention claimed is:

1. An attitude sensing device for determining an attitude of a reference axis of a package containing a fibre optic sensor, comprising:
   an electro-mechanical attitude sensor for generating an electrical signal indicative of the attitude of that attitude sensor; and
   converter logic for converting the electrical signal into a stimulus signal; the fibre optic sensor being responsive to the stimulus signal to cause a variation in at least one predetermined property of an optical signal transmitted through the fibre optic sensor, the attitude of the reference axis being determinable from the variation of the predetermined property.

2. An attitude sensing device as claimed in claim 1, further comprising: a power source for the electro-mechanical attitude sensor and the converter logic.

3. An attitude sensing device as claimed in claim 2, wherein the power source is a battery.

4. An attitude sensing device as claimed in claim 3, further comprising an opto-electronic converter coupled to the battery, and arranged to receive an optical charge signal transmittable to the opto-electronic converter via an optical fibre, the opto-electronic converter being responsive to the optical charge signal to generate a current used to charge the battery.

5. An attitude sensing device as claimed in claim 1, wherein the fibre optic sensor is a vibration sensor, and the converter logic comprises:
   control logic for generating a drive signal dependent on the electrical signal generated by the electro-mechanical attitude sensor; and
   a vibration source for receiving the drive signal and generating as the stimulus signal a sequence of vibrations dependent on the drive signal; whereby the fibre optic vibration sensor is responsive to the sequence of vibrations to cause the variation in the at least one property of the optical signal.

6. An attitude sensor as claimed in claim 5, wherein the sequence of vibrations from the vibration source is encoded digitally.

7. An attitude sensor as claimed in claim 5, wherein the sequence of vibrations from the vibration source is encoded using vibrations of varying amplitude.

8. An attitude sensor as claimed in claim 5, wherein the sequence of vibrations from the vibration source is encoded using vibrations of varying frequency.

9. An attitude sensor as claimed in claim 5, wherein the sequence of vibrations from the vibration source is encoded using vibrations of varying duration.

10. An attitude sensing device as claimed in claim 5, wherein the vibration source is a piezoelectric vibrator.

11. An attitude sensing device as claimed in claim 5, further comprising a receiver for receiving a command signal, the receiver being responsive to the command signal to switch on the attitude sensor to cause the electrical signal to be generated.

12. An attitude sensing device as claimed in claim 11, wherein the command signal comprises a predetermined vibration sequence and the receiver is formed by the vibration source, the vibration source being further arranged to convert the received command signal into an electrical signal used to switch on the attitude sensor.

13. An attitude sensing device as claimed in claim 5, further comprising:
   a further electro-mechanical attitude sensor for generating an electrical signal indicative of the attitude of that further attitude sensor, the further attitude sensor being mounted at an angle with respect to the attitude sensor, the converter logic being arranged to receive the electrical signals from both attitude sensors, and to generate a single drive signal dependent on those electrical signals which is used to generate the sequence of vibrations.

14. An attitude sensing device as claimed in claim 13, wherein a coding scheme is used for the sequence of vibrations from the vibration source such that the attitude of each attitude sensor is represented independently within the sequence of vibrations.

15. An attitude sensing device as claimed in claim 14, wherein the coding scheme is a time division multiplexed scheme.

16. An attitude sensing device as claimed in claim 1, wherein the fibre optic sensor is a geophone.

17. An attitude sensing device as claimed in claim 1, further comprising a timer for determining when to switch on the attitude sensor to cause the electrical signal to be generated.

18. An attitude sensing device as claimed in claim 1, further comprising a receiver for receiving a command signal, the receiver being responsive to the command signal to switch on the attitude sensor to cause the electrical signal to be generated.

19. An attitude sensor as claimed in claim 18, wherein the receiver is an optical receiver and the command signal is an optical command signal transmittable to the optical receiver via an optical fibre.

20. An attitude sensing device as claimed in claim 1, further comprising:

a further electro-mechanical attitude sensor for generating an electrical signal indicative of the attitude of that further attitude sensor, the further attitude sensor being mounted at an angle with respect to the attitude sensor, the converter logic being arranged to receive the electrical signals from both attitude sensors, and to generate a single drive signal dependent on those electrical signals which is used to generate the sequence of vibrations.

21. A package comprising:
one or more fibre optic sensors; and
an attitude sensing device as claimed in claim 1.

22. An array of packages coupled by a fibre optic cable, each package comprising one or more fibre optic sensors coupled to the fibre optic cable, and an attitude sensing device as claimed in claim 1.

23. A method of determining an attitude of a reference axis of a package containing a fibre optic sensor, comprising the steps of:
(i) employing an electro-mechanical attitude sensor within the package to generate an electrical signal indicative of the attitude of that attitude sensor;
(ii) converting, within the package, the electrical signal into a stimulus signal;
(iii) arranging the fibre optic sensor to be responsive to the stimulus signal to cause a variation in at least one predetermined property of an optical signal transmitted through the fibre optic sensor; and
(iv) determining the attitude of the reference axis from the variation of the predetermined property.

* * * * *